(12) United States Patent
Kellil et al.

(10) Patent No.: US 8,140,074 B2
(45) Date of Patent: Mar. 20, 2012

(54) MOBILE COMMUNICATION NETWORK

(75) Inventors: Mounir Kellil, L'Hay les Roses (FR);
Christophe Janneteau, Chaudon (FR);
Alexis Olivereau, Orsay (FR);
Alexandru Petrescu, Orsay (FR)

(73) Assignee: Motorola Solutions, Inc., Schaumburg, IL (US)

( * ) Notice: Subject to any disclaimer, the term of this patent is extended or adjusted under 35 U.S.C. 154(b) by 770 days.

(21) Appl. No.: 12/200,336

(22) Filed: Aug. 28, 2008

(65) Prior Publication Data
US 2010/0056148 A1    Mar. 4, 2010

(51) Int. Cl.
*H04W 36/00* (2009.01)

(52) U.S. Cl. ............ 455/436; 455/432.1; 455/433; 455/437; 455/439; 455/442; 370/328; 370/331; 370/332; 370/338

(58) Field of Classification Search ........... 455/432.1, 455/433, 436, 437, 439, 442; 370/328, 331, 370/332, 338
See application file for complete search history.

(56) References Cited

U.S. PATENT DOCUMENTS

| | | | |
|---|---|---|---|
| 2001/0012777 A1* | 8/2001 | Igarashi et al. | 455/435 |
| 2003/0016655 A1 | 1/2003 | Gwon | |
| 2004/0013116 A1 | 1/2004 | Greis et al. | |
| 2004/0137901 A1 | 7/2004 | Hamasaki et al. | |
| 2005/0128969 A1 | 6/2005 | Lee et al. | |
| 2006/0030326 A1* | 2/2006 | O'Neill et al. | 455/439 |

FOREIGN PATENT DOCUMENTS
EP    1512306 B1    3/2006

OTHER PUBLICATIONS

Ergen, et al., "Application of GPS to Mobile IP and Routing in Wireless Networks," Proceedings of the IEEE 56th Vehicular Technology Conference, 2002, VTC 2002—Fall 2002, vol. 2, Sep. 24-28, 2002, pp. 1115-1119.

Hernandez, et al., "Predictive mobile IP for Rapid Mobility," Proceedings of the 29th IEEE International Conference on Local Computer networks, Nov. 16-18, 2004, pp. 684-689.

Dutta, et al., "GPS-IP based Fast-Handoff for Mobiles," proceedings of the 3rd New York Metro Area Networking Workshop, NYMAN Workshop 2003, Sep. 12, 2003, 3 pages.

Moon, et al., "History-Based Adaptive QoS Provisioning in Mobile IP Networks," Proceedings of the IEEE Global Telecommunications Conference, 2003, GLOBECOM'03, vol. 6, Dec. 1-5, 2003, pp. 3483-3487.

Wakikawa, Et Al., "Multiple Care-of Addresses Registration," Monami6 Working Group, Internet-Draft, Standards Track, The IETF Trust, Mar. 5, 2007, 41 pages.

Gundavelli, et al., "Proxy Mobile IPv6," NETLMM WG, Internet Draft, Standards Track, The IETF Trust, Nov. 4, 2007, 71 pages.

* cited by examiner

*Primary Examiner* — Nick Corsaro
*Assistant Examiner* — Amanuel Lebassi
(74) *Attorney, Agent, or Firm* — Steven A. May; Daniel R. Bestor (57) ABSTRACT

A mobile communication network comprises a home agent supporting mobility of a mobile entity by generating bindings between a home address of the mobile entity and a care of address of the mobile entity. A mapping processor provides at least one set of mappings between a potential future care of address for a mobile entity and a real time characteristic criterion. The mappings may for example be determined in response to previous movements of the mobile entity in the communication network. A processor determines a real time characteristic and the home agent is arranged to change a binding between the home address and a current care of address in response to the at least one set of mappings and the real time characteristic, and without receiving binding updates from the mobile entity. The approach may allow support for mobility of a mobile entity while reducing signalling in support of mobility.

20 Claims, 4 Drawing Sheets

MOBILE COMMUNICATION NETWORK

FIELD OF THE INVENTION

The invention relates to a mobile communication network, a home agent and a method of operation therefor and in particular, but not exclusively, to communication networks based on the internet protocol.

BACKGROUND OF THE INVENTION

There is an increasing tendency to provide mobility support for networks and protocols that have traditionally been aimed at fixed communication applications. For example, there is a desire to include mobility support for the popular Internet Protocol (IP) which is used in many communication networks and in particular there is a desire to increasingly base mobile cellular communication systems on infrastructure that uses IP as standardized by the Internet Engineering Task Force (IETF).

Accordingly, recent versions of the Internet Protocols have been developed or enhanced to provide mobility support for mobile nodes and networks.

Specifically, a mobility enhancement known as NEMO (NEtwork MObility) has been developed for Internet Protocol version 4 (IPv4) as e.g. described in K. Leung et al, "Network Mobility (NEMO) Extensions for Mobile IPv4", draft-ietf-mip4-nemo-v4-base-06.txt, IETF Internet Draft, work in progress, 31 Oct. 2007, and for IPv6 as e.g. described in V. Devarapalli et al., "Network Mobility (NEMO) Basic Support Protocol", IETF RFC 3963, Standards Track, January 2005.

Also, the Internet Protocol version 6 (IPv6) is being developed to inherently support mobility as e.g. described in D. Johnson et al., "Mobility Support in IPv6", IETF RFC 3775, Standards Track, June 2004.

Accordingly, these networks allow a Mobile Entity (ME) to move between IP subnets in an IP infrastructure while maintaining its ongoing IP sessions. The supporting mobility protocols are defined for both IPv4 and IPv6, and rely on dynamic establishment of a bi-directional tunnel between the ME's current point of attachment (defined by the Care-of Address (CoA) for the ME) and its mobility anchor point (the Home Agent (HA)) in its home network. In the downstream direction, IP packets addressed to the ME (i.e. IP packets addressed to the ME's home address or to a destination address which matches the ME's mobile subnet (if the ME is a mobile router)) are intercepted by the HA and routed over the tunnel to the ME's CoA. Similarly, in the upstream direction, IP packets sourced by the ME (or by any of its attached nodes in case of a mobile router) are tunneled towards the HA, and from there routed to the destination.

In order to continue receiving traffic sent to its home address (HoA) when roaming to a foreign link, the ME will specifically send a message (requesting a binding of its HoA to its current CoA) to the HA. The message used to bind the HoA to the CoA is known as a Registration Request (RREQ) in MIPv4 and a Binding Update (BU) in MIPv6. The registration message is acknowledged by a Registration Reply (RREP) or Binding Acknowledgement (BA) message transmitted by the HA.

However, although this approach may enable or facilitate mobility, the process has some associated disadvantages and in particular the communication of registration/binding updates, the associated forwarding delays, and the tunnel initialization tend to degrade the performance of the mobile IP protocols during handovers of the ME between different sub-networks. Indeed, if the ME's handover frequency is high, the approach will result in significant communication overheads and handover delays. Furthermore, the associated signaling increases bandwidth usage and the complexity/processing requirement of the ME and HA.

Hence, an improved system would be advantageous and in particular a system allowing increased flexibility, improved mobility support/performance, facilitated operation, improved binding update operation and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a mobile communication network comprising: a home agent for supporting mobility of a mobile entity by generating bindings between a home address of the mobile entity and a care of address of the mobile entity; a mapping processor for providing at least one set of mappings comprising at least one mapping between a potential future care of address for a mobile entity and a real time characteristic criterion; a processor for determining a real time characteristic; and wherein the home agent is arranged to change a binding between the home address and a current care of address in response to the at least one set of mappings and the real time characteristic and without receiving binding updates from the mobile entity.

The invention may allow improved performance and/or facilitated operation or implementation for a mobile communication network. The invention may in many scenarios allow automated binding updates without the typical registration/binding update delays and resource usage associated with updating bindings. The invention may allow reduced binding update/registration communication in the mobile communication networks and may in particular in many scenarios allow improved performance for the individual mobile entity by reducing the delay and resource usage associated with the mobile entity requesting the binding update. In many scenarios, the invention may allow a sequence of binding updates to be automatically performed by the home agent to support mobility of the mobile entity without requiring any active control or input from the mobile entity.

The real time characteristic may specifically be any dynamically changing parameter value or property (or combination of values or properties) which reflects a current context of the mobile entity. The real time characteristic may specifically be a real time context characteristic for the mobile entity. The context may be e.g. a current use environment characteristic for the mobile entity, such as a time and/or location for the mobile entity.

Specifically, the home agent may be arranged to determine the current care of address as a care of address mapped to a real time characteristic criterion which is met by the real time characteristic.

The set of mappings may for example comprise a predicted sequence of care of addresses together with parameter criteria/requirements indicating when the next care of address of the sequence should be applied. Specifically, the set of mappings may comprise a sequence of care of addresses together with a definition of when a binding update to the next care of address in the sequence should be applied.

The mobile entity may specifically be a mobile node and/or a mobile router and/or a mobile subnet of e.g. an IP network.

In accordance with another aspect of the invention, there is provided a home agent for a mobile communication network, the home agent comprising: a binding processor for supporting mobility of a mobile entity by generating bindings between a home address of the mobile entity and a care of address of the mobile entity; a mapping processor for providing at least one set of mappings comprising at least one mapping between a potential future care of address for a mobile entity and a real time characteristic criterion; a processor for determining a real time characteristic; and wherein the home agent is arranged to change a binding between the home address and a current care of address in response to the at least one set of mappings and the real time characteristic and without receiving binding updates from the mobile entity.

In accordance with another aspect of the invention, there is provided a method of operation for a mobile communication network comprising a home agent for supporting mobility of a mobile entity by generating bindings between a home address of the mobile entity and a care of address of the mobile entity; the method comprising: providing at least one set of mappings comprising at least one mapping between a potential future care of address for a mobile entity and a real time characteristic criterion; determining a real time characteristic; and the home agent changing a binding between the home address and a current care of address in response to the at least one set of mappings and the real time characteristic and without receiving binding updates from the mobile entity.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a communication network using a mobile Internet Protocol such as a mobile IPv4 protocol or a mobile IPv6 protocol. However, it will be appreciated that the invention is not limited to this application but may be applied to many other networks.

Figure 1:
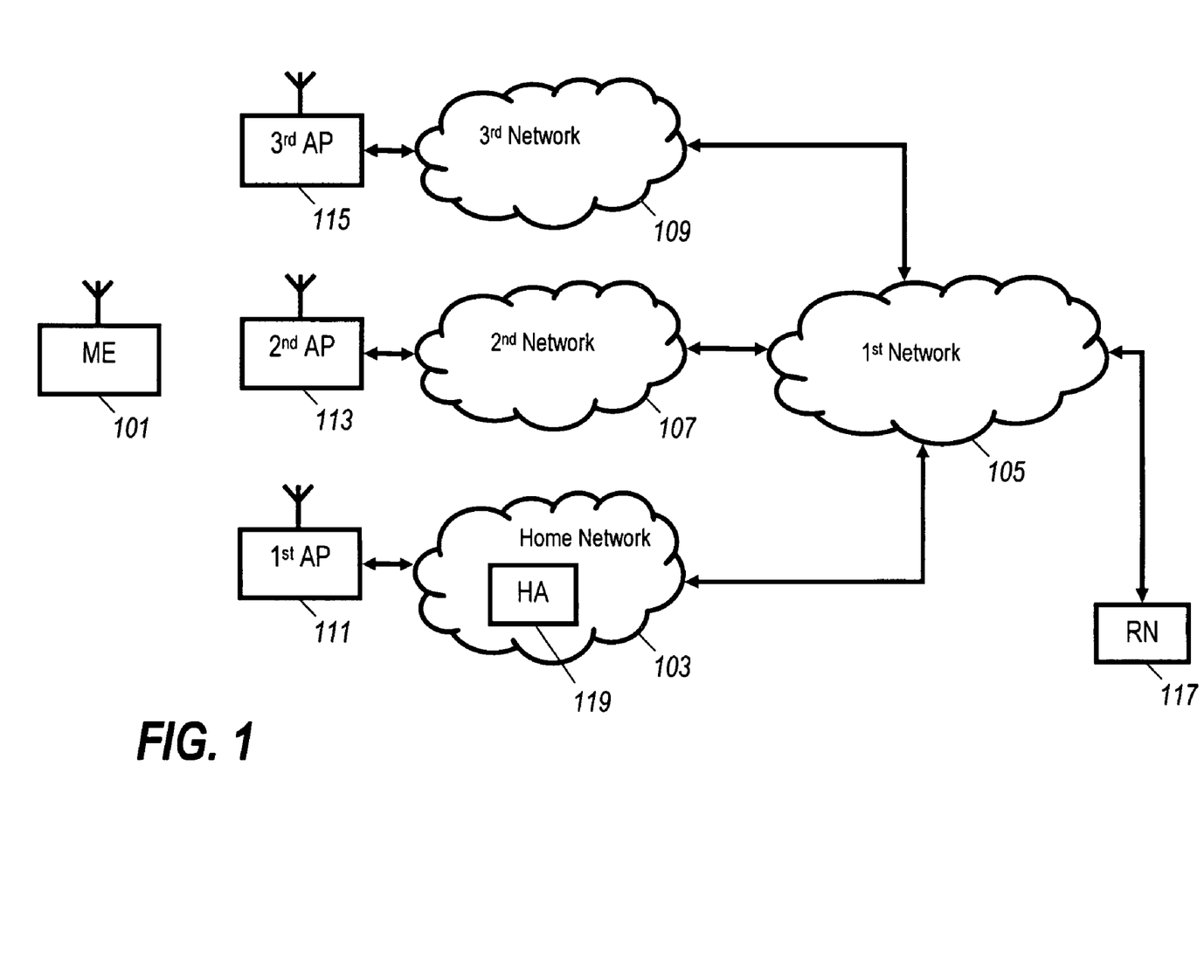
FIG. 1 illustrates an example of a mobile communication network in accordance with some embodiments of the invention.

FIG. 1 illustrates an example of a mobile communication network in accordance with some embodiments of the invention. In the specific example, the communication network is a mobile IPv6 communication network but it will be appreciated that the described approach will be equally applicable to other network such as in particular an IPv4 communication system employing the NEMO mobility extension.

In the system, Mobile Entities (MEs) may move within the communication network such that they change their point of attachment to the network. In particular, a specific ME 101 may move in the network such that it is supported in different sub-networks that each has a specifically assigned address space. Accordingly, when the ME 101 moves from one sub-network to the other, it is assigned a new IP address.

A Mobile Entity (ME 101) may specifically be a single mobile node but may also be e.g. an entire subnetwork and/or a mobile router which further supports other mobile entities (such as other mobile nodes).

In the specific example, the ME 101 has a home network 103 with which the ME 101 is registered. In addition, the communication network comprises a first network 105 and a number of further sub-networks of which FIG. 1 specifically illustrates a second network 107 and a third network 109 which are both coupled to the first network 105. In the example of FIG. 1, the first network 105 is an interconnecting network between a plurality of sub-networks (including the home network 103 and the second and third networks 107, 109) each of which has a dedicated IP address space that is individually handled and managed by the (sub)networks. Thus, in the example, each of the home network 103 and the second and third networks 107, 109 comprises an IP address controller that allocates IP addresses within the address space allocated to the network. Accordingly, nodes within the home network 103 are allocated an IP address within the IP address space allocated to the home network 103, nodes within the second network 107 are allocated an IP address within the IP address space allocated to the second network 107 and nodes within the third network 107 are allocated an IP address within the IP address space allocated to the third network 107.

In the example, the home network 103 and the second and third networks 107, 109 are all wireless access networks that comprise a plurality of wireless access points to which MEs may attach. FIG. 1 specifically illustrates a first access point 111 of the home network 103, a second access point 113 of the second network 107 and a third access point 115 of the third network 115 (it will be appreciated that the access points 111, 113, 115 may be considered part of respectively the home network 103 and the second and third networks 107, 109 although FIG. 1 for further clarity illustrates them external to the networks 103, 107, 109).

In the system, MEs may accordingly move around and change their attachment points within a specific sub-network or between sub-networks. For example, the ME 101 may move from the first access point 111 to be attached via the second access point 113 and may then move on to be attached via the third access point 115. In such a sequence, the ME 101 may accordingly have three different IP addresses at different times. In the example, a data communication session is set up with a remote node 117 that transmits data packets to the ME 101.

In accordance with the Mobile IPv6 protocol, the mobility of the ME 101 is supported by a Home Agent (HA) 119 of the home network 103 of the ME 101. The HA 119 is capable of keeping track of the IP address of the ME 101 as this moves in the communication network. Specifically, the ME 101 is allocated a Home Address (HoA) by an address server (not shown) of the home network 103. When the ME 101 moves to another subnetwork, such as the second network 107 or the third network 109, it is allocated a CoA of that subnetwork. Conventionally, the ME 101 transmits a binding update message to the HA 119 which informs this of the new CoA allocated to the ME 101. The HA 119 proceeds to initiate a binding between the HoA and the current CoA of the ME 101. Accordingly, all incoming data packets for the ME 101 are routed to the HA 119 which then proceeds to forward the data packets to the current location of the ME 101 by tunneling the data packets to the current CoA indicated by the current binding.

Specifically, the Mobile IP protocol defined in RFC 3344 and RFC 3775 allows an ME to roam between different IP subnets without disrupting its ongoing communications. In the approach, the ME owns a HoA that is routable in the ME's home domain/network and it will dynamically acquire a CoA that is routable in the IP subnet the MN is attached to. The HA of the ME then changes data packets that are addressed to the HoA of the ME to be addressed to the current CoA thereby ensuring that the data packets reach the ME at its current location.

However, in order to ensure that the bindings of the HA 119 are current, it is necessary for the ME 101 to transmit binding update messages to the HA 119 whenever the ME 101 moves to a new subnetwork. However, the time delays associated with such binding update processes tend to be fairly substantial and in particular communication networks that have a high round trip time (RTT) or with path congestion risks tend to have an inefficient binding update process.

For example, the binding update process over large RTT radio access networks can take up to several seconds. During this time all data communications of the ME are interrupted (until the new CoA of the ME is communicated to and acknowledged by HA). Similarly, the binding update process over networks with high level of congestion or over lossy radio access networks will have a high probability of loss of one or more signalling messages being exchanged between ME and HA in order to complete the binding update process. Such loss of a signalling message will require retransmission, after a given timeout, resulting in an increased handover delay and associated interruption of ME communications.

Moreover, although a conventional registration/binding update procedure may be acceptable for infrequent handover cases, this procedure may result in performance degradation of Mobile IP protocols if the handover frequency is high (e.g., mobile nodes such as vehicles traveling fast compared to how often the successive access points are visible, or a mass mobility of nodes like individual travelers within a train). Indeed, frequent handovers will result in significant communication overheads and handover delays due to the registration request/reply signaling (preceded by the care-of address acquisition).

The system of FIG. 1 comprises functionality that allows the bindings of the HA 119 to be automatically updated in certain scenarios without an ME supported by the HA 119 (and specifically the ME 101) transmitting binding updates to the HA 119. Specifically, the system includes mechanisms that in some scenario enable HAs to keep track of node mobility without notifications from the node. Specifically, the supporting HA may automatically update the CoA for an ME in response to a mapping between CoAs and real time characteristics that are directly or indirectly indicative of the current location of the ME in the network. Thus, the HA can be provided with a list of mappings between an ME's CoA and real-time parameters that will be known to the HA (such as a geographical position of the ME and/or a current time of day).

The mapping information may for example be generated by the ME and/or the HA in response to previous movements of the ME in the network. For example, the ME may store information of the list of CoAs and associated timings for its current journey so that this mapping may be provided to the HA for a future session that e.g. starts at the same time of day. Alternatively or additionally, the mappings may be generated by the HA e.g. based on a detection of a pattern in the ME's previous movements in the network.

As a specific example the ME 101 may be a portable Internet access device which is used by the owner during his daily journey to work. For example, every weekday morning around 8 AM, the ME 101 may start a data session which initially is supported by the first access point 111 followed by the second access point 113 and then the third access point 115. In the example, the same IP address may every day be allocated to the ME 101 by the corresponding subnetwork. Thus, when the ME 101 uses the second access point 113 to access the network it is always provided with the same IP address.

In many systems, the IP address allocated to a roaming ME by a subnetwork/access point will be the same for consecutive accesses by the ME. Specifically, within each Access Point's reach, a given ME will be allocated the same IP address if the address allocation scheme is based on a unique identifier (typically a Network Address Identifier, NAI, permanently assigned to a user; or a unique Media Access Control, MAC, address permanently assigned to a ME). For example, the Point-to-Point Protocol (PPP) and the Dynamic Host Configuration Protocol (DHCP) are both able to allocate the same IP address to a ME when the ME presents its unique NAI or MAC address. Thus, the IP address for a given ME when moving into a different subnetwork may be in many cases be predictable.

The ME 101 and/or the HA 119 may detect that this sequence of IP addresses is followed almost all weekday mornings and may furthermore detect the times at which the handovers between the different subnetworks typically occur. Accordingly, a mapping between the IP address and specific time intervals is provided to the binding functionality of the HA 119. The HA 119 may accordingly determine which CoA to use for data packets to the ME 101 depending on the time of day. For example, the ME 101 may typically be served by the first access point 111 from 8.00 AM to 8.10 AM after which it is typically served by the second access point 113 until 8.30 AM at which time it typically hands over to the third access point 115 (e.g. until the session terminates at 9.00 AM).

In such a scenario, the ME 101 may e.g. detect that a data session is being setup at around 8.00 AM on weekday mornings. It may accordingly transmit a message to the HA 119 containing the list of mappings between IP addresses of the first, second and third access points 111, 113, 115 and the time interval in which they are typically used. The HA 119 may accordingly proceed to change the binding simply based on the time of day. Thus, until 8.10 AM the HoA is used for the ME 101. At 8.10 AM the HA 119 then automatically switches to use the IP CoA address of the second network 107. At 8.30 AM the HA 119 then proceeds to automatically switch to use the IP CoA address of the third network 109. Furthermore, during the session from 8.00 AM to 9.00 AM, the ME 101 does not transmit any registration binding update messages to the HA 119. Thus, an efficient support of a specific mobility of the ME 101 is supported with reduced complexity, signalling and delays. Thus, improved performance of the communication network may be achieved while still supporting mobility.

Figure 2:
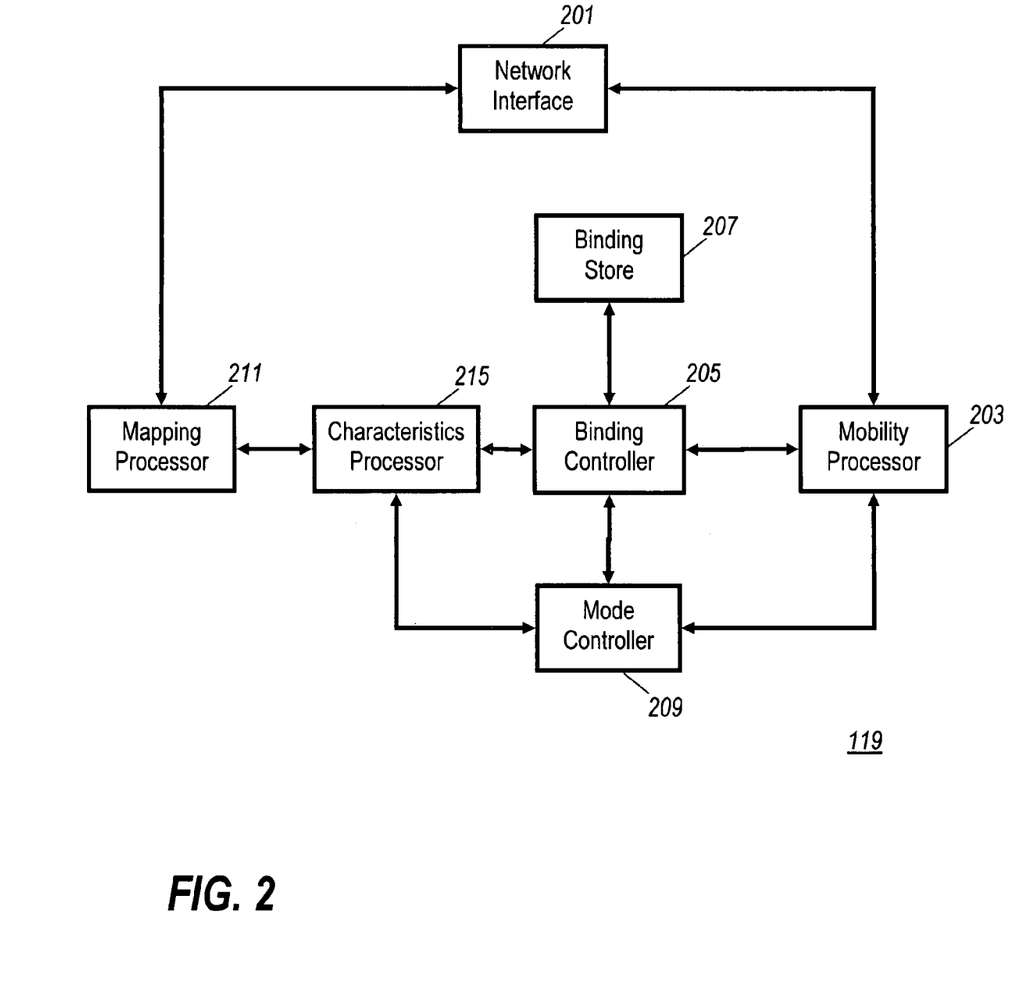
FIG. 2 illustrates an example of a home agent of a mobile communication network in accordance with some embodiments of the invention.

FIG. 2 illustrates elements of the HA 119 in more detail.

The HA 119 comprises a network interface 201 which couples the HA 119 to the home network 103. The network interface 201 is coupled to a mobility processor 203 which is arranged to support the mobility of the ME 101 as well as other MEs served by the HA 119. Specifically, incoming data packets for the ME 101 are received by the network interface 201 and forwarded to the mobility processor 203. The mobility processor 203 then evaluates whether the ME 101 can be reached using the HoA of the ME 101. If so, it forwards the incoming data packet to the HoA and otherwise it proceeds to identify the current CoA for the ME 101 in accordance with the current binding stored for the ME 101.

Specifically the mobility processor 203 is coupled to a binding controller 205 which is further coupled to a binding store 207. The binding store 207 stores the current bindings for the ME supported by the HA 119. Thus, when the mobility processor 203 receives the data packet it feeds the HoA of that data packet to the binding controller 205 which proceeds to access the binding store 207 to retrieve the corresponding current CoA. This CoA is then fed to the mobility processor 203 which proceeds to tunnel the received data packet to the ME using the CoA.

The binding controller 205 is furthermore coupled to a mode controller 209. In the example, the HA 119 can operate in two different binding update modes. In accordance with the first mode, the HA 119 only changes the bindings in response to binding update messages received from the MEs. Thus, this first mode of operation corresponds to the conventional mode of operation for mobile IP protocols. However, in addition, the HA 119 can operate in a second mode of operation corresponding to an automatic binding update mode in which at least one binding update may be performed by the HA 119 without any binding update messages being received from the ME 101. Thus, when in the automatic binding update mode for the ME 101, at least one binding between a HoA and a CoA for the ME 101 is controlled by the HA 119 itself rather than by the ME 101. In the example, the mode controller 209 is arranged to select a binding update mode for each individual ME and each individual data session.

It will be appreciated that any suitable criterion or means for changing between the different modes of operation may be used without detracting from the invention.

When the HA 119 operates in the automatic binding update mode, it uses a predetermined set of mappings between CoAs and a real time characteristic, such as a current time or a current location of the corresponding ME. Specifically, the HA 119 comprises a mapping processor 211 which is arranged to provide at least one set of mappings which comprises at least one mapping between at least one potential future CoA for an ME and a real time characteristic criterion. Typically, each set of mappings may comprise a number of mappings between a possible CoA (or CoAs) for an ME and a real time characteristic criterion which must be met for the CoA to be used for the ME, i.e. for the binding for the ME to be between the HoA and the corresponding CoA.

For example, in the specific scenario described for the ME 101, a set of mappings may be provided between CoAs and a real time characteristic in the form of a current time. E.g., a first mapping is between the HoA of the ME 101 and the current time requirement of 8.00 AM to 8.10 AM on a weekday. A second mapping is between the CoA of the second network 107 and the current time requirement of 8.10 AM to 8.30 AM. A third mapping is between the CoA of the third network 109 and the current time requirement of 8.30 AM to e.g. 9.00 AM (at which time the communication session may typically be switched off).

It will be appreciated that the mapping processor 211 may store a plurality of different sets of mappings, including sets for different MEs and/or a plurality of sets of mappings for the same ME. For example, for the ME 101, a second set of mappings may be stored for a typical movement of the ME 101 at the end of the working day (e.g. the reverse sequence of addresses may be stored for a return journey typically being taken by the user at the end of the day).

The HA 119 furthermore comprises a characteristics processor 215 which is arranged to determine a real time characteristic. As a specific example, the real time characteristic may be a current time. The characteristics processor 215 is coupled to the binding controller 205 and the mapping processor 211.

When the mode controller 209 controls the HA 119 to operate in the automatic binding update mode, the binding controller 205 instructs the characteristics processor 215 to continually (e.g. at frequent periodic intervals) generate a new indication of the real-time characteristic. Furthermore, the characteristics processor 215 accesses the mapping processor 211 every time a new indication is generated. The mapping processor 211 compares the generated indication to the criteria stored for the specific set of mappings currently used for the ME. If the mapping processor 211 detects that the real-time indication meets a new criterion that was not previously met, it returns the CoA mapped to the new criterion to the characteristics processor 215. The characteristics processor 215 then feeds the new CoA to the binding controller 205 which proceeds to update the current binding for the ME from being between the HoA and the CoA of the criterion of the set of mappings that was previously met to be between the HoA and the new CoA. This binding update is performed completely independently of and separately from the ME 101, and in particular without receiving any binding updates from the ME.

E.g. in the specific example, the binding controller 205 may control the characteristics processor 215 to generate a new current time indication every 30 seconds. Thus, every 30 seconds the mapping processor 211 may evaluate whether the current time has moved from being within a time interval defined for a first CoA to being within a time interval defined for a second CoA. When such a change is detected, the mapping processor 211 returns the new CoA which is then used in the updated binding. E.g. when the current time reaches 8.30 AM, the binding for the ME 101 is updated from being between the HoA and the CoA of the second network 207 to be between the HoA and the CoA of the third network 109.

Thus, when the HA 119 is operating in the automatic binding update mode it can change the binding between the HoA and the current CoA in response to the set of mappings and the real time characteristic. This update is performed automatically and without receiving binding updates from the ME.

In the example wherein the binding updates are only based on the current time, the HA 119 has predetermined estimates for which CoA is to be used as a function of the current time. In the example, the only data used in the set of mappings may be a time and a CoA. For a given current time, a specific CoA is then identified as the current CoA for the binding. For example, the sets of mappings may be stored as a data structure such as the following:

| ME | Time | Care-of Address |
| --- | --- | --- |
| ME1's HoA | Time 11 | CoA11 |
|  | Time 12 | CoA12 |
|  | . | . |
|  | . | . |
|  | . | . |
|  | Time 1n | CoA1n |
| . | . | . |
| . | . | . |
| . | . | . |

-continued

| ME | Time | Care-of Address |
|---|---|---|
| MEm's HoA | Time m1 | CoAm1 |
| | Time m2 | CoAm2 |
| | . | . |
| | . | . |
| | . | . |
| | Time mn | CoAmn |

The described approach may substantially reduce overheads and handover delays which arise when using conventional binding update/response or registration request/response signalling from MEs to HAs. Particularly attractive performance may be achieved for MEs roaming in Radio Access Networks having high Round-Trip Times (RTT) such as for Dimetra systems (which may have round trip delays of 1 sec or higher), DataTAC systems or systems based on ME 101 links.

It will be appreciated that many other real-time characteristics than a current time may alternatively or additionally be used. E.g. the real time characteristic may be any dynamically changing property which that reflects a current context of the ME. Specifically, the real time characteristic may be (or include) an indication of a physical context of the ME 101, such as a current time or location of the ME.

Specifically, in some embodiments, the real time characteristic criterion for one, more or all of the mappings of a set of mappings may comprise a location requirement for the ME. Furthermore, the real time characteristic generated by the characteristics processor can comprise a location indication for the ME.

The location indication may be an indication of a location which is generated by the ME itself. For example, the ME may comprise a GPS location receiver which continuously estimates the current location for the ME. This location estimate may regularly be transmitted to a location server of the communication network and from the location server it may be transmitted to the HA 119.

As another example, a location server may use a completely different approach to directly or indirectly track the location of the ME. For example it may be determined that the journey made by the user corresponds to a train journey (or the user may manually input this information). Accordingly a location server tracking the current position of the train may transmit such location information to the HA 119 which may proceed to use this information as a location estimate for the ME.

For example, the French public transport company RATP (Régie Autonome des Transports Parisiens) utilizes a location server to collect different location parameters for busses in order to measure/estimate the real-time/accurate location of these. The collected parameters are GPS position, distance, speed, and acceleration obtained from telemetry equipment on the bus. If it is known (or estimated) that the user of the ME uses a specific bus for his daily journey, the information for this bus may be transmitted to the HA 119 from this location server and used to estimate the location of the ME.

In some embodiments, location information may be obtained from other network elements of the network. Specifically, an access element for the network may be arranged to detect when a new ME hands over to it and in response it may generate a detection message and transmit this to the HA 119. The HA 119 may then determine the current location indication in response to this detection message.

For example, each of the access points 111-115 may be arranged to generate a simple detection message when the ME 101 hands over to the access point 111-115. This message is then sent to the HA 119 which uses it to update the current location estimate. As a simple example, the current location estimate may simply consist in an identification of the access point currently serving the ME 101. As a specific example, the set of mappings may include a mapping between the first access point 111 and the HoA, another mapping between the second access point 113 and the CoA of the second network 107 and a mapping between the third access point 115 and the CoA of the third network 109. Thus, in this example, when the HA 119 receives the detection message from the second access point 113, it proceeds to retrieve the corresponding mapping and thus proceeds to update the binding to be between the HoA and the CoA of the second network 107.

In some embodiments, the detection message may comprise an access location indication for the network access element and this may be used to determine the current location indication which is compared to the requirements. For example, a mapping may define a geographical area which is considered to correspond to the coverage provided by the second network 107. All access points within the second network may include their specific location in the detection message sent to the HA 119. If a new detection message is received which comprises a location indication which is within the geographic area considered to be covered by the second network 107, this will map to the CoA of the second network 107.

In the example wherein the binding updates are only based on a location estimate, the HA 119 has predetermined estimates for which CoA is to be used as a function of the current location estimate. In such an example, the only data used in the set of mappings may be a location and a CoA. For a given location, a specific CoA is then identified as the current CoA for the binding. For example, the sets of mappings may be stored as a data structure such as the following:

| ME | Location | Care-of Address |
|---|---|---|
| ME1's HoA | Position 11 | CoA11 |
| | Position 12 | CoA12 |
| | . | . |
| | . | . |
| | Position 1n | CoA1n |
| . | . | . |
| . | . | . |
| MEm's HoA | Position m1 | CoAm1 |
| | Position m2 | CoAm2 |
| | . | . |
| | . | . |
| | Position mn | CoAmn |

It will be appreciated that other location indications or estimates may be used including for example an access router identifier; a radio access point identifier; other localization information (for example acquired by RFID sensors within the operator network) or a proximity to other stable deployed entities (e.g. within 100 m/ft range of the local broadcast tower).

In some examples, the binding updates may be based on both a location estimate and a current time and the HA 119 may have predetermined estimates for which CoA is to be used as a function of the current time and location estimate. In such an example, the data used in the set of mappings may comprise both a location, a time and a corresponding CoA. For example, the sets of mappings may be stored as a data structure such as the following:

| Mobile Node | Time | Location | Care-of Address |
|---|---|---|---|
| MN1's HoA | Time 11 | Position 11 | CoA11 |
|  | Time 12 | Position 12 | CoA12 |
|  | . | . | . |
|  | . | . | . |
|  | . | . | . |
|  | Time 1n | Position 1n | CoA1n |
| . | . | . | . |
| . | . | . | . |
| . | . | . | . |
| MNm's HoA | Time m1 | Position m1 | CoAm1 |
|  | Time m2 | Position m2 | CoAm2 |
|  | . | . | . |
|  | . | . | . |
|  | . | . | . |
|  | Time mn | Position mn | CoAmn |

In such an example, policies and rules may e.g. be defined for resolving contradictory requirements or mappings.

It will be appreciated that the decision of whether to operate in a conventional binding update mode wherein binding updates are made in response to binding updates from the ME or to operate in the automated binding update mode may in different embodiments be made by different entities. For example, in some embodiments, the HA 119 may detect that a ME is currently starting a movement which is likely to correspond to a known sequence of IP addresses as reflected by a set of mappings. For example, the mode controller 209 may be provided with a current time indication as well as the current binding for the ME 101. If these match a given criterion (such as e.g. that the HoA is currently used for the ME 101 and the current time is between 8.00 AM and 8.10 AM) then the mode controller 209 may switch the HA 119 into automatic binding update mode for the ME 101. It may then also proceed to transmit a notification message to the ME 101 to indicate that this should not transmit any binding updates for the time being.

It will also be appreciated that, as previously described, the set of mappings may be generated by different entities and in different ways. For example, the HA 119 may monitor the sequences of CoA addresses and may in response generate the sets of mappings. As another example, a user or operator may explicitly indicate that a specific sequence should be stored as a set of mappings.

In the specific example, the operation is predominantly controlled by the MEs. Specifically, the MEs may generate mapping data as well as decide when to use the reduced binding update/automatic binding update modes of operation.

Figure 3:
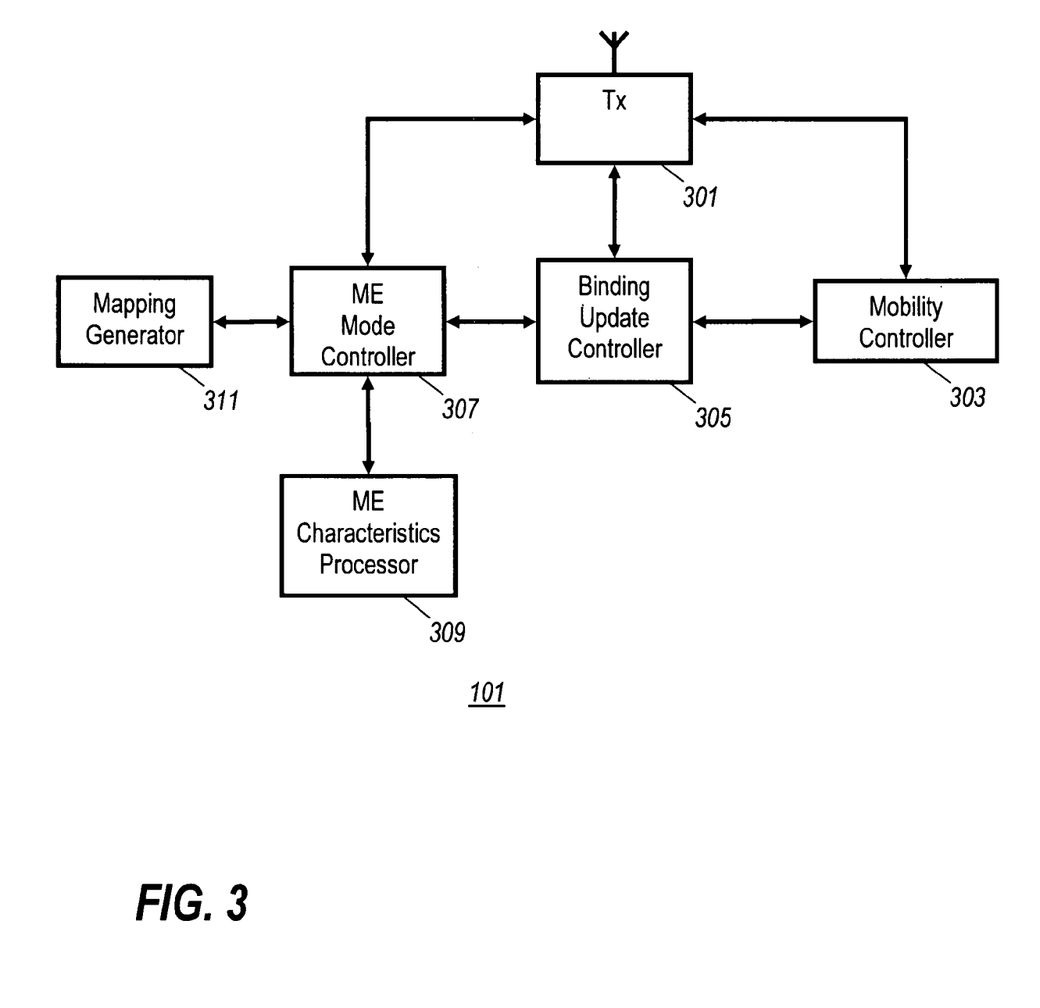
FIG. 3 illustrates an example of a mobile entity of a mobile communication network in accordance with some embodiments of the invention.

FIG. 3 illustrates the ME 101 in more detail for such an example.

The ME 101 comprises a wireless transceiver 301 which is arranged to communicate with wireless access points 111-115 over suitable air interfaces of the communication system.

The transceiver 301 is coupled to a mobility controller 303 which is capable of supporting the mobility functions of the communication network. Specifically, the mobility controller 303 is capable of handing over between different access points 111-115 and is furthermore arranged to support and control handovers between different subnetworks. Thus the mobility controller 303 is arranged to obtain new IP addresses for the ME 101 when entering a new sub network.

The mobility controller 303 is coupled to a binding update controller 305 which is furthermore coupled to the transceiver 301. In addition, the binding update controller 305 is coupled to an ME mode controller 307 which is capable of switching between different binding update modes.

Specifically, the ME 101 can operate in the first mode of operation which corresponds to a conventional operation for mobility support. Thus, in this mode of operation, binding updates are transmitted to the HA 119 whenever the mobility controller 303 informs the binding update controller 305 that a new IP address has been allocated to the ME 101.

In addition, the ME 101 can operate in a second mode of operation which corresponds to a reduced binding update mode of operation in which the ME 101 is arranged to not transmit (at least one) binding update notifications to the HA 119. Thus, in this second mode of operation no binding updates are transmitted even though the ME 101 is allocated a new IP address from a different subnetwork to which the ME 101 has just handed over.

The ME mode controller 307 is arranged to switch the ME 101 into the reduced binding update mode of operation in response to a detection that a current set of conditions meet a criterion associated with a predicted binding relationship for the ME 101. Specifically, the ME 101 may have stored a number for criteria which are considered to be indicative of the ME 101 being likely to follow a movement pattern for which a set of mappings exist.

In the example, the ME mode controller 307 is coupled to an ME characteristics processor 309 which determines one or more real time values. These values are fed to the ME 101 mode controller 307 which compares them to a list of stored corresponding parameter requirements for which a set of mappings has been generated. If the values meet one of the criteria, the ME 101 is entered into the reduced binding update mode of operation.

The set of conditions and/or the corresponding criterion may in different embodiments be relatively complex or may be very simple. For example, the ME 101 characteristics processor 309 may simply provide a current time indication and the ME mode controller 307 may simply enter the ME 101 into the reduced binding update mode of operation if the current time matches a given criterion. For example, if a new communication session is set up within, say, three minutes of 8.00 AM on a weekday, the ME mode controller 307 may enter the ME 101 into the reduced binding update mode of operation.

When the ME 101 enters the reduced binding update mode, the ME mode controller 307 proceeds to transmit a reduced binding update mode activation message to the HA 119. In response to receiving this activation message, the HA 119 enters the automated binding update mode wherein binding updates are made automatically by the HA 119 without any binding update messages being received from the ME 101.

In the example, some or all of the mappings comprised in a set of mappings used by the HA 119 are generated by the ME 101. Thus, in the example, the ME 101 generates mappings between potential future CoAs for the ME 101 and real time characteristic criteria and transmits these mappings to the home agent.

Specifically, the ME 101 comprises a mapping generator 311 which continuously monitors the movement of the ME 101 within the network. Specifically, the mapping generator 311 may monitor which IP addresses are allocated to the ME 101 and in which time intervals these are allocated. The mapping generator 311 may then detect patterns and repetitions and use these to generate suitable mappings. For example, the mapping generator 311 may detect the pattern that the ME 101 every weekday morning from 8.00 AM to 9.00 AM follows a sequence of first using the HoA for 10 minutes, followed by a different specific IP address for 20 minutes followed by a third IP address for 30 minutes. In response, it may generate the mappings between the times and the IP addresses. These may then be transmitted to the HA 119 which then proceeds to store a suitable set of mappings.

Thus, at least one set of mappings may be generated based on previous CoAs and real time context characteristics for the ME 101.

In the specific example, an indication of a set of mappings between potential future CoAs and real time characteristic criteria is transmitted to the HA 119 when the ME 101 enters the current reduced binding update mode. Specifically, when the ME 101 mode controller 307 enters the ME 101 into the reduced binding update mode, it also proceeds to retrieve the mappings suitable for this scenario. These mappings are then included in the reduced binding update mode activation message sent to the HA.

It will be appreciated that in different embodiments and scenarios, different criteria may be used to exit the reduced binding update mode. As a specific example, the ME 101 mode controller 311 may simply exit this reduced binding update mode when the current time exceeds an end time predetermined for the set of mappings. For example, the ME 101 may exit the reduced binding update mode at 9.00 AM.

However, in some embodiments, the ME 101 may alternatively or additionally exit the reduced binding update mode of operation in response to a determination that a current context for the ME does not match a predicted context for the ME.

Specifically, the generated mapping data may associate a specific IP address with a criterion for context parameters for the ME. If the current context parameters for the ME do not match those expected in accordance with the mapping data, the separate binding update performed by the HA 119 based on the predicted movement will no longer correspond to the actual movement of the ME. Accordingly, the ME mode controller 309 can proceed to exit the ME from the reduced binding update mode of operation. Furthermore, it may transmit a message to the HA 119 that causes the HA 119 to exit the automatic binding update mode of operation and return to conventional operation. Specifically, the ME 101 may transmit a new binding update message that contains the current assigned IP address for the ME 101.

E.g. in the specific example, if the ME 101 is still allocated the HoA at 8.15 AM, the ME 101 may terminate the automated binding mode of operation as the predicted performance can no longer be relied on. For example, the user may be staying at home that day or the train may be delayed.

It will be appreciated that in some embodiments, a plurality of sets of mappings may be provided. For example, a set of mappings may be provided for the user's journey in the morning, another one for his typical journey in the evening, another for a typical journey at weekends etc. In such a case, the HA 119 may select between the different sets of mappings based on a real time context characteristic for the ME.

For example, the specific set of mappings used may be based on a current location of the ME or a current time. E.g. if the current time is 8.00 AM, the set of mappings corresponding to the users morning journey is selected etc.

In some scenarios, it may not be feasible to accurately predict the exact conditions in which the handover from one subnetwork to another is performed and thus it is not possible or practical to accurately align the handover of the ME 101 and the automatic binding update of the HA 119. In such situations, the data may possibly be buffered in the new subnetwork until the ME 101 performs the handover. Alternatively, some or all of the data transmitted during this misalignment may be lost and the data communication may rely on a retransmission scheme to compensate for the lost data (or the occasional data disruption may be acceptable).

However, in some embodiments the handover performance may be made more reliable by the HA 119 being arranged to simultaneously bind the HoA to a plurality of CoAs during an estimated handover time. Thus, if the real time characteristic determined by the characteristics processor 215 meets a given criterion associated with conditions for an estimated handover, the HA 119 may perform multicasting wherein both the pre-handover CoA and the post-handover CoA is used. For example, for a short time interval around 8.30 AM, the HA 119 may forward incoming data packets for the ME 101 to both the CoA of the second network 107 as well as to the CoA of the third network 109.

In some embodiments, the HA 119 can update the set of mappings in response to real time characterizing data for the ME 101 received from a remote network element. E.g. intermediary entities may compute mapping updates based on various parameters and send these to the HA 119 so that this can track/predict the current and future network locations with more accuracy. For example, in the specific example of the journey corresponding to a bus journey for a known route, the location information for that bus may be used to update the set of mappings. Specifically, the criterion for a CoA may be changed accordingly. As a specific example, if the information indicates that the bus is two minutes late, the time requirements of the set of mappings may simply be offset by two minutes.

In some cases the remote network element may indeed be the ME 101 itself. For example, the ME 101 may detect that the change from the HoA to the CoA of the second network 107 occurs at 8.11 AM rather than at 8.10 AM as expected. It may then notify the HA 119 of this delay thereby resulting in a change of the criterion for changing the binding update to be to the CoA of the third network 109 from 8.30 AM to 8.31 AM.

Thus, the ME 101 may synchronize the binding update operation of the HA 119 with the movement of the ME 101. This synchronization does involve a new roundtrip delay to the HA but in many situations this may be a preferred tradeoff relative to the ME 101 sending a new binding update for each handover.

It will be appreciated that although the previous description has focused on examples wherein a single CoA is mapped to the HoA by the HA, the described principle is equally applicable to a scenario where the ME owns a home address and a plurality of care-of addresses. Specifically, the sets of mappings may simply be extended to include a plurality of CoAs for each real time characteristic criterion.

In the specific example described each CoA is uniquely associated with one ME. Thus, in the example a unique CoA is determined by the HA for a managed ME. This may specifically be the case for environments where the topology of network infrastructure is known in advance. Also it, may specifically be the case for deployments where IPv6 or publicly-routable (non-NAT) IPv4 addresses are used as these are guaranteed to be unique in the network (e.g. they are unique Internet addresses).

In some embodiments, one or more of the CoAs indicated in the set of mappings may comprise only a partial address for the ME. For example, the stored mapping may be a mapping of a real time characteristic criterion to an address prefix which is associated with the subnetwork in which the mobile is assumed to be in when the criterion is met.

In this case the HA 119 may determine the full CoA by combining the partial address with an address part that is allocated to the ME independently of a location of the ME. Specifically, a common address part may be located to the ME independently of which subnetwork is serving this. Specifically, the ME may permanently be allocated an address suffix that can be combined with the prefix of the specific subnetwork to yield a full current address for the ME.

As a specific example, IPv6 stateless address auto-configuration provides mechanisms that allow a node to itself generate a topologically routable address. This is done by combining a generated suffix and the local subnetwork prefix. The suffix is generally derived in a deterministic way from the Layer 2 identifier of the attaching interface. In such an example, the HA may determine the suffix from a stored set of mappings and may predict the suffix (for example by determining it from the ME's HoA).

In some embodiments, the remote node 117 with which the ME 101 is communicating may be a corresponding node capable of transmitting data to the ME 101 by directly addressing the current CoA of the ME 101. Thus, in such cases, the remote node 117 may be able to perform route optimization such that data packets can be transmitted directly to the ME 101 without these first being routed to the HA 119 and then tunneled to the ME 101. This may allow a more efficient communication but requires the remote node 117 to be able to track the movement of the ME 101 and specifically to identify when new CoAs are allocated to the ME 101. This may conventionally be achieved by the ME 101 also transmitting binding updates to the remote node 117.

However, in addition, the network of FIG. 1 allows the remote node 117 to use the same approach that the HA 119 uses for automatic binding updates to update the current CoA for the ME 101.

Thus, in the example, the remote node may comprise a mapping unit which provides one or more sets of mappings between a potential future CoA for the ME and a real time characteristic criterion. A processor may then determine a real time characteristic, such as a current time, and may evaluate the criteria to find one that is met by the characteristic. The remote node can then determine the current CoA as the CoA which is mapped to this criterion in the set of mappings.

Thus, the approach described with reference to the HA may be used to allow any Corresponding Node (CN) to be aware of IP mobility of the ME without receiving explicit Mobile IP notifications. E.g. if the ME performs binding registration exchanges with every CN to which it has an open application ("Route Optimization", RO), in addition to exchanging this with the HA, then the approach of automatic CoA adaptation may also be applied to the CN. This will provide the benefits of using optimized paths together with reduced mobility signalling.

Figure 4:
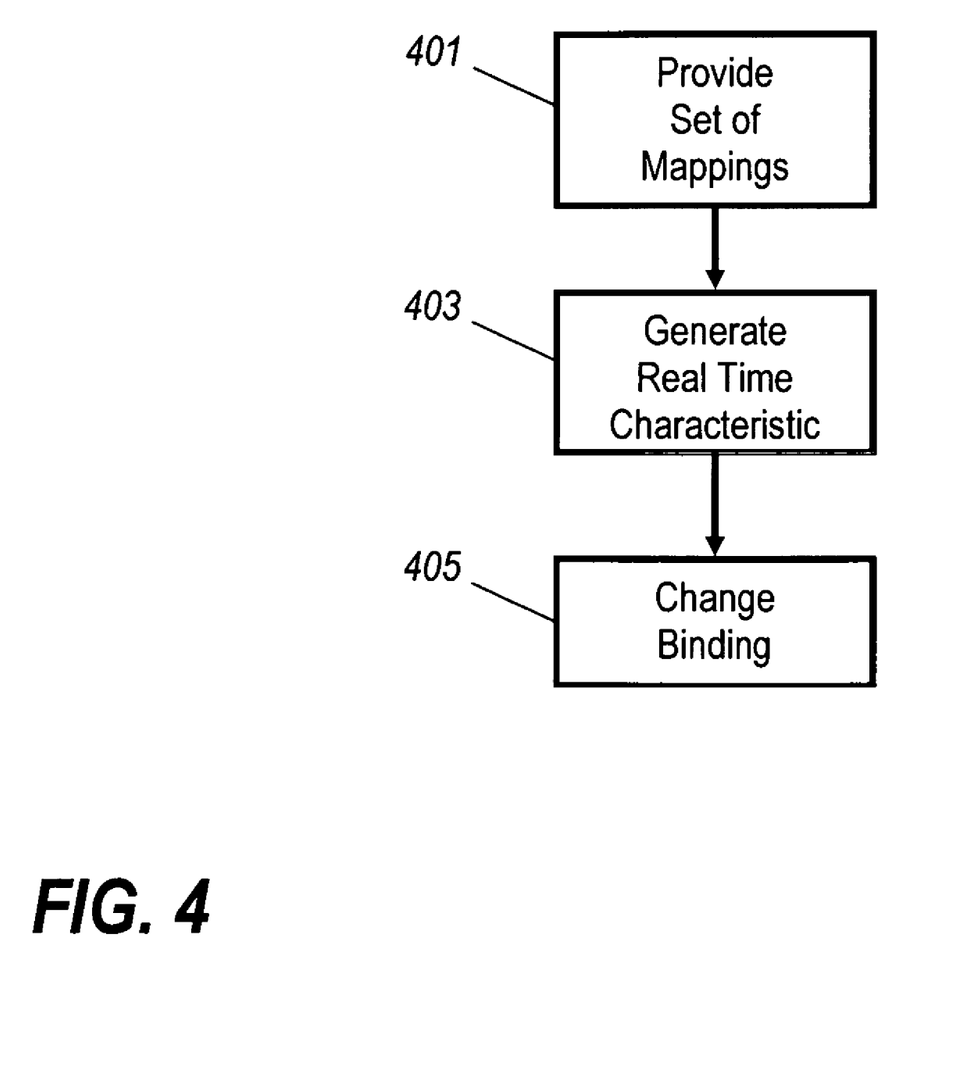
FIG. 4 illustrates an example of a method of operation for a mobile communication network in accordance with some embodiments of the invention.

FIG. 4 illustrates an example of a method of operation for a mobile communication network in accordance with some embodiments of the invention. The mobile communication network comprises a home agent for supporting mobility of a mobile entity by generating bindings between a home address of the mobile entity and a care of address of the mobile entity.

The method initiates in step 401 wherein at least one set of mappings between a potential future care of address for a mobile entity and a real time characteristic criterion is provided.

Step 401 is followed by step 403 wherein a real time characteristic is determined.

Step 403 is followed by step 405 wherein the home agent changes a binding between the home address and a current care of address in response to the at least one set of mappings and the real time characteristic and without receiving binding updates from the mobile entity.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A mobile internet protocol (IP) communication network for allowing a mobile entity to move between IP subnets in an IP infrastructure while maintaining its ongoing IP sessions and reducing a number of binding updates required to be sent from the mobile entity to its home agent, the method comprising:

a home agent configured to support mobility of the mobile entity by generating a binding between a static home address of the mobile entity and a varying care of address of the mobile entity;

a mapping processor configured to provide at least one set of mappings comprising at least one mapping between a potential future care of address for a mobile entity, different from a current care of address for the mobile entity, and a real time characteristic criterion; and a processor configured to determine a real time characteristic and to determine, by comparing the real time characteristic with the real time characteristic criterion, whether the care of address for the mobile entity should be changed from the current care of address to the potential future care of address;

wherein the home agent is further configured to change the binding between the home address and the care of address to reflect the potential future care of address in response to the comparison and without receiving a corresponding binding update from the mobile entity reflecting the potential future care of address.

2. The mobile IP communication network of claim 1, wherein:

the real time characteristic criterion comprises a current time requirement; and the real time characteristic comprises a current time indication.

3. The mobile IP communication network of claim 2, wherein the home agent is further configured to change the binding from being between the home address and the current care of address to being between the home address and the potential future care of address in response to the current time indication changing from meeting a first current time requirement for the current care of address to meeting a second current time requirement for the potential future care of address.

4. The mobile IP communication network of claim 1, wherein:

the real time characteristic criterion comprises a location requirement for the mobile entity; and the real time characteristic comprises a current location indication for the mobile entity.

5. The mobile IP communication network of claim 4, further comprising:

a network access element for mobile entities configured to transmit a detection message for the mobile entity to the home agent in response to a detection that the mobile entity has accessed the network access element;

wherein the home agent is further configured to determine the current location indication in response to the detection message.

6. The mobile IP communication network of claim 5, wherein:

the detection message comprises an access location indication for the network access element, and the home agent is further configured to determine the current location indication in response to the access location indication.

7. The mobile IP communication network of claim 4, further comprising means for receiving the location indication for the mobile entity from a remote location server configured to track a location of the mobile entity.

8. The mobile IP communication network of claim 1, wherein the mobile entity is configured to generate a second set of mappings between potential future care of addresses for the mobile entity and real time characteristic criteria and to transmit the second set of mappings to the home agent for use in further modifying the bindings in the future in accordance with the second set of mappings and without receiving binding updates from the mobile entity.

9. The mobile IP communication network of claim 1, wherein the mobile entity is configured to:

enter a reduced binding update mode of operation in response to a determination that a current set of conditions meet a criterion associated with a second set of mappings, the mobile entity being configured to refrain from transmitting binding update notifications to the home agent when in the reduced binding update mode; and transmit a reduced binding update mode activation message to the home agent when entering the reduced binding update mode;

wherein the home agent is further configured to enter an automatic binding update mode in response to receiving the reduced binding update mode activation message, the home agent being arranged to change the binding between the home address and the current care of address in response to the at least one set of mappings when in the automatic binding update mode and to change the binding in response to received binding updates from the mobile entity when not in the automatic binding update mode.

10. The mobile IP communication network of claim 9, wherein the mobile entity is configured to transmit an indication of a third set of mappings between potential future care of addresses and real time characteristic criteria to the home agent when entering the reduced binding update mode of operation.

11. The mobile IP communication network of claim 9, wherein the mobile entity is configured to exit the reduced binding update mode of operation in response to a determination that a current context for the mobile entity does not match a predicted context for the mobile entity.

12. The mobile IP communication network of claim 1, wherein:

the mapping processor is configured to provide a plurality of sets of mappings for the mobile entity; and the home agent is configured to select the at least one set of mappings from the plurality of sets of mappings in response to a real time context characteristic for the mobile entity.

13. The mobile IP communication network of claim 1, wherein the mapping processor is configured to generate the at least one set of mappings in response to a detected pattern of previous care of addresses and associated detected real time context characteristics for the mobile entity.

14. The mobile IP communication network of claim 1, wherein the home agent is further configured to simultaneously bind the home address to both the current care of address and the potential future care of address in response to the real time characteristic meeting a handover criterion.

15. The mobile IP communication network of claim 1, wherein:

at least one potential future care of address of the set of mappings is represented only by a partial address; and the home agent is further configured to determine a full care of address by combining the partial address with an address part allocated to the mobile entity independently of a location of the mobile entity.

16. The mobile IP communication network of claim 1, further comprising a corresponding node configured to communicate with the mobile entity;

wherein the corresponding node comprises:

a processor configured to cause data packets to be transmitted to the mobile entity using the current care of address for the mobile entity;

a mapping unit configured to provide at least the first set of mappings between the potential future care of address for the mobile entity and the real time characteristic criterion;

the processor further configured to determine the first real time characteristic and to determine, by comparing the real time characteristic with the real time characteristic criterion, whether the care of address for the mobile entity should be changed from the current care of address to the potential future care of address; and the processor further configured to cause further packets to be transmitted to the mobile entity using the potential future care of address in response to the comparison and without receiving care of address updates from the mobile entity.

17. The mobile IP communication network of claim 1, wherein the home agent is further configured to update the set of mappings in response to real time characterizing data for the mobile entity received from a remote network element.

18. The mobile communication network of claim 1, wherein the mobile communication network is a mobile Internet Protocol (IP) communication network.

19. A home agent for an internet protocol (IP) mobile communication network for allowing a mobile entity to move between IP subnets in an IP infrastructure while maintaining its ongoing IP sessions and reducing a number of binding updates required to be sent from the mobile entity to the home agent, the home agent comprising:

a binding processor configured to support mobility of the mobile entity by generating a binding between a static home address of the mobile entity and a varying care of address of the mobile entity;

a mapping processor configured to provide at least one set of mappings comprising at least one mapping between a potential future care of address for a mobile entity, different from a current care of address for the mobile entity, and a real time characteristic criterion; and a processor configured to determine a real time characteristic and to determine, by comparing the real time characteristic with the real time characteristic criterion, whether the care of address for the mobile entity should be changed from the current care of address to the potential future care of address;

wherein the home agent is further configured to change the binding between the home address and the care of address to reflect the potential future care of address in response to the comparison and without receiving a corresponding binding update from the mobile entity reflecting the potential future care of address.

20. A method of operation for an internet protocol (IP) mobile communication network comprising a home agent for supporting mobility of a mobile entity to move between IP subnets in an IP infrastructure while maintaining its ongoing IP sessions and reducing a number of binding updates required to be sent from the mobile entity to its home agent by generating a binding between a static home address of the mobile entity and a varying care of address of the mobile entity, the method comprising:

providing at least one set of mappings comprising at least one mapping between a potential future care of address for the mobile entity and a real time characteristic criterion;

determining a real time characteristic and determining, by comparing the real time characteristic with the real time characteristic criterion, whether the care of address for the mobile entity should be changed from a current care of address to the potential future care of address; and changing, by the home agent, the binding between the home address and the care of address to reflect the potential future care of address in response to the comparison and without receiving a corresponding binding update from the mobile entity reflecting the potential future care of address.

* * * * *